United States Patent [19]

Demosthenous et al.

[11] Patent Number: 5,114,486
[45] Date of Patent: May 19, 1992

[54] PIGMENTS

[75] Inventors: Maria Demosthenous, Calais; Francis Van Meyel, Marck, both of France

[73] Assignee: Tioxide Group PLC, England

[21] Appl. No.: 674,955

[22] Filed: Mar. 26, 1991

[30] Foreign Application Priority Data

Apr. 4, 1990 [GB] United Kingdom ............... 9007602

[51] Int. Cl.⁵ ............................... D05B 3/02
[52] U.S. Cl. ............................ 106/443; 106/442; 106/427; 106/428
[58] Field of Search ............... 106/443, 442, 427, 428

[56] References Cited

U.S. PATENT DOCUMENTS

| | | | |
|---|---|---|---|
| 2,817,595 | 12/1957 | Kalinowski | 106/443 |
| 3,926,660 | 12/1975 | Holle et al. | 106/443 |
| 4,460,655 | 7/1984 | Jacobson et al. | 106/442 |

FOREIGN PATENT DOCUMENTS

| | | |
|---|---|---|
| 1287576 | 12/1968 | United Kingdom. |
| 1256341 | 1/1970 | United Kingdom. |
| 1419157 | 11/1973 | United Kingdom. |

Primary Examiner—William R. Dixon, Jr.
Assistant Examiner—Margaret V. Einsmann
Attorney, Agent, or Firm—Banner, Birch, McKie & Beckett

[57] ABSTRACT

A new process for the production of pigments suitable for use in paper laminates has been developed in which a metal oxide is treated with a water-soluble salt of zinc and a phosphate or phosphoric acid and subsequently with an alkali metal aluminate in such a manner that there is deposited on the metal oxide a coating containing zinc and phosphate ions together with aluminium ions. The pH of the dispersion following the metal oxide is maintained at a value not exceeding 8.0 during precipitation. A particularly useful pigment is produced which has a coating containing zinc ions in an amount of 0.5 to 5% by weight as ZnO, phosphate ions in an amount of 0.2 to 3% as $P_2O_5$ and aluminium ions in an amount of 0.5 to 5% expressed as $Al_2O_3$ on the weight of $TiO_2$.

12 Claims, No Drawings

PIGMENTS

This invention relates to pigments and particularly to titanium dioxide pigments suitable for use in paper laminates.

Many pigments have been proposed for use in paper laminates but for one reason or another have not secured acceptance as commercial products in which lightfastness and ease of manufacturing are of considerable importance.

A new pigment has been developed which has good lightfastness and other properties which should render the pigment eminently suitable for use in paper laminates and similar products.

According to the present invention a process for the production of a pigment comprises forming an aqueous dispersion of a metal oxide pigment containing a water soluble salt of zinc and a phosphate or phosphoric acid, adding to the dispersion an alkaline solution of an alkali metal aluminate to precipitate a coating containing zinc and phosphate ions and maintaining the pH of the dispersion during precipitation of the coatings at a value not exceeding 8.0.

According to the invention also a pigment suitable for use in a paper laminate comprises particulate titanium dioxide pigment having a coating on the particles thereof comprising zinc ions in an amount of from 0.5% to 5% by weight expressed as ZnO phosphate ions in an amount of from 0.2% to 3.0% by weight expressed as $P_2O_5$ and aluminium ions in amount of from 0.5% to 5.0% by weight expressed as $Al_2O_3$ on weight of $TiO_2$.

Whilst any metal oxide pigment can be produced and coated by the process of the present invention it is titanium dioxide pigments that are the preferred products. The titanium dioxide can be anatase or rutile but preferably the product will be rutile titanium dioxide pigment. The pigment particles to be treated in the process of the invention can be manufactured by any of the well-known methods such as that known as the "sulphate" process or the "chloride" process.

The process of the invention will be described particularly with reference to titanium dioxide but only as an example of the many metal oxides that can be so treated.

The pigment to be treated is formed into an aqueous dispersion after milling, if desired. The pigment in the case of a sulphate process pigment is the calciner discharge or in the case of the "chloride" process pigment is the reactor discharge. Milling can be carried out by a sand mill.

To the aqueous dispersion there is added the source of zinc and usually this is a water-soluble salt of zinc, such as a zinc sulphate or zinc chloride in an amount sufficient to provide the chosen level of coating zinc. Typically the source of zinc is added in the form of an aqueous solution. Usually the amount of the zinc salt will be such as to provide from 0.5% to 5% by weight of zinc expressed as ZnO on the weight of $TiO_2$ and preferably from 1% to 3% by weight.

A source of phosphate is added to the aqueous dispersion together with, or separately from the source of zinc and suitable sources of phosphate are water-soluble phosphates and phosphoric acid itself. Typical water-soluble phosphates that can be used are the alkali metal phosphates such as sodium or potassium phosphate or ammonium phosphate. The source of the phosphate can be added in the form of an aqueous solution.

Amounts of phosphate or phosphoric acid added to the aqueous dispersion of the pigment are such as to provide from 0.2% to 3.0% by weight phosphate expressed as $P_2O_5$ on weight of $TiO_2$ and preferably from 0.5% to 2% by weight $P_2O_5$.

To the aqueous dispersion there is then added an alkaline solution of an alkali metal aluminate which has the effect of raising the pH of the dispersion and thereby effecting at least some reaction of the water-soluble compounds of zinc and the phosphate or phosphoric acid to precipitate a coating on the particles of titanium dioxide comprising zinc and phosphate ions or radicals or species.

If desired an alkali can be added to the aqueous dispersion prior to the alkali metal aluminate to raise the pH to a value of up to, say, 5.

Typically during the addition of the alkaline solution of the aluminate the pH of the aqueous dispersion rises to a desired value of, e.g. 6 to 6.5 and when such a pH value is reached then, if necessary, an amount of a mineral acid such as sulphuric acid is added to maintain the pH at the desired value of from 6 to 6.5, if desired simultaneously with any remaining alkaline solution of aluminate required to be added. Alternatively a calculated amount of mineral acid can be added initially to the dispersion of titanium dioxide prior to the addition of any alkaline solution of aluminate and, if desired, before the addition of the water-soluble salt of zinc.

That the pH of the dispersion during precipitation of the coatings does not exceed pH 8.0 and preferably is not greater than pH 7.0. Most preferably the pH does not exceed 6.5 at the completion of the addition of the alkaline solution.

An acidic source of aluminium such as an acidic water-soluble salt of aluminium can be added to the aqueous dispersion prior to the addition of the alkaline solution of aluminate but when such an addition is made then it is desirable in the final resulting coated product that at least half of the aluminium species present in the product as coating originated from the alkaline solution of the aluminate i.e. the amount of the acidic source of aluminium provides less than half of the total amount of total aluminium species.

The coating of the pigment is carried out at any convenient temperature ranging from room temperature to about 90° C., usually from 50° C. to 70° C.

After coating the pigment can be milled, as desired, and usually milling will be effected in a fluid energy mill employing steam as the milling fluid.

The pigment also can contain a surface stabiliser which has the effect of increasing further the resistance of a composition containing the pigment to discolouration by light. Examples of suitable surface stabilisers are the halates and perhalates such as metal chlorates, bromates, iodates, metaperiodates and paraperiodates. Another surface stabiliser is an antimony oxide precipitated into association with the pigment.

These surface stabilisers in some instances are believed to act as oxidising agents.

Preferably the surface stabiliser is a source of fluoride and typical sources which are useful in the present invention are the fluorides of barium, strontium, magnesium, tin, antimony, titanium, zirconium, sodium, potassium, ammonium, lithium, aluminium and zinc and of the rare earth metals. The most preferred source of fluoride is calcium fluoride in its purified form or in its natural form of fluorspar.

Preferably the surface stabiliser is insoluble or only slightly soluble in water and if a soluble source is employed then care should taken not to wash this out of the pigment after treatment.

The pigment is treated usually with the surface stabiliser either prior to or during the deposition of the coatings. The addition of the surface stabiliser can be made in the form of a solid, or as a milled aqueous dispersion or the surface stabiliser can be formed in situ as a precipitate from suitable reactants, for example, from a soluble metal salt and a soluble fluoride. Should the surface stabiliser itself be water-soluble then this may conveniently be added to the pigment immediately prior to the finishing stage such as fluid energy milling.

The pigments of the present invention are of particular use in the formation of pigmented aminoplastic resinous materials and especially when these are used to form white or coloured laminates which are required to be resistant to discolouration by light. Such laminates are products in which the resin acts not only as reinforcement for one or more layers or masses of such materials as wood, glass fibre and paper or other fabric but also to impart strength and durability to the finished product. A typical decorative paper laminate consists of pigmented paper sheets impregnated with resin and cured under pressure at elevated temperature. The resin may alternatively contain filler such as fibre glass, wood flour etc and be used in safety helmets etc.

Typical aminoplastic resinous materials which may be used with titanium dioxide prepared in accordance with the present invention are melamine-formaldehyde, urea-formaldehyde and phenol-formaldehyde resins.

Accordingly the present invention also provides a process for the manufacture of a pigmented aminoplastic resinous material in which a coated titanium dioxide pigment in accordance with the invention is added, if desired with a carrier material comprising a fibrous base, to an aminoplastic resinous material, which is then heated to effect formation of a cross-linked state.

Whilst it is believed that the pigment of the invention is coated with the stated materials this is not restrictive in any way and the invention should be understood to include pigments in which the stated materials have been precipitated into association with the titanium dioxide.

The present invention is illustrated in the following Examples.

EXAMPLE 1 Comparative

A slurry containing 250 g/l rutile titanium dioxide pigment which had been sandmilled with an alkanolamine dispersant was warmed to 50° C. To this slurry, while stirring, was added a solution of aluminium sulphate in a quantity equivalent to 1.2% w/w $Al_2O_3$ on $TiO_2$. There was then added a solution of ammonium dihydrogen phosphate, $(NH_4)H_2PO_4$, equivalent to 1.7% w/w $P_2O_5$ on $TiO_2$.

A solution of sodium aluminate, $NaAlO_2$, stabilised with caustic soda, was added slowly, while stirring, to raise the pH of the slurry to 5.3. Further $NaAlO_2$ solution was added, together with dilute sulphuric acid to maintain pH 5.2 to 5.5, until the total aluminate corresponded to 1.8% $Al_2O_3$ w/w on $TiO_2$.

The liquid phase was then filtered off and the resulting cake was washed, dried in a spray drier and milled in a fluid energy mill supplied with super-heated steam.

EXAMPLE 2

To a second portion of the same sandmilled rutile slurry at 250 gpl pigment and 50° C. was added zinc sulphate solution in a quantity equivalent to 3.0% w/w ZnO on $TiO_2$. Then was added a solution of $(NH_4)H_2PO_4$ to give 1.7% w/w $P_2O_5$ on $TiO_2$. A $NaAlO_2$ solution as above was added to raise the pH to 6.3 and then, with dilute $H_2SO_4$ to maintain pH 6.0 to 6.5, until the total $Al_2O_3$ from aluminate was 1.8% w/w on $TiO_2$.

The pigment was filtered, washed, dried and milled as in Example 1.

The products from Examples 1 and 2 were incorporated into paper at 25% w/w, on dry paper. The paper was impregnated with a melamine/formaldehyde resin and then compressed with unpigmented core papers into a laminate at 98 psi and cured at 135°–145° C. The cured laminate panels were exposed to UV in a Xenotest 450LF weatherometer and the lightfastness was assessed by comparing exposed and non-exposed areas. Discolouration was rated against both standard blue-dyed wool fabrics (blue wool scale, b.w.s.) where a high value is equivalent to a more lightfast dye, and standard grey panels (Grey Scale—GS) where higher values correspond to greater discolouration. Two commercial titanium dioxide pigments used in paper laminates designated Pigments A and B, were also employed to make panels. Pigment A was a sulphate process pigment having an aluminium phosphate/aluminium hydroxide coating in amounts equivalent to approximately 3.0% $Al_2O_3$ and 1.9% $P_2O_5$ (w/w) in pigment when expressed as the oxides. Pigment B also was a sulphate pigment coated with aluminium silicate/aluminium hydroxide and an antimony V compound to give approximately coating amounts expressed as oxides of 3.5% $Al_2O_3$; 1.6% $SiO_2$ and 1.1% $Sb_2O_5$ (w/w), on pigment. Results after 96 hours exposure are shown below:

|  | Lightfastness | |
| --- | --- | --- |
|  | b.w.s. | GS |
| Example 1 | 4 | 7 |
| Example 2 | 7 | 3 |
| Pigment A | 6½ | 3½ |
| Pigment B | 5 | 5½ |

The zinc/aluminium phosphate coated pigment of Example 2 gave superior lightfastness.

EXAMPLE 3

A rutile titanium dioxide pigment slurry was sandmilled, diluted to 250 gpl and warmed to 50° C. To this was added, while stirring, zincسسulphate solution to give 3.0% w/w ZnO on $TiO_2$ and then ammonium dihydrogen phosphate solution to give 1.7% $P_2O_5$ on $TiO_2$. The pH was then raised over 30 minutes to 6.3 using a solution of caustic soda. The slurry was stirred for a further 30 minutes, filtered and washed. The resulting cake was shear thinning and difficult to handle. The pigment was dried in an oven at 110° C. and milled in a fluid energy mill with superheated steam.

EXAMPLE 4

A pigment was prepared as in Example 3 except that the pH was raised using a solution of sodium aluminate stabilised with caustic soda. The pH was held at 6.0–6.5 by co-adding dilute $H_2SO_4$ until the total $Al_2O_3$ addition was 1.8% w/w on TiO$_2$. The resulting washed filter cake could be handled without difficulty.

EXAMPLE 5

A pigment was prepared as in Example 4 except that the ZnSO$_4$ and (NH$_4$)H$_2$PO$_4$ additions were reduced to give 1.5% ZnO and 0.85% P$_2$O$_5$ w/w on TiO$_2$. Again the washed filter cake could be handled without difficulty.

The products of Examples 3-5 were tested in paper laminates as above and compared with Pigments A and B as described in Example 1 or 2.

The amount of pigment needed to achieve 25% by weight in the dry paper varied and this is shown below as the % retention.

|  | % Retention | Lightfastness b.w.s | GS |
|---|---|---|---|
| Example 3 | 51.8 | 7½ | 1½ |
| Example 4 | 62.3 | 7 | 3 |
| Example 5 | 65.6 | 7½ | 1½ |
| Pigment A | 66.8 | 6½ | 3½ |
| Pigment B | 67.0 | 5 | 5½ |

Pigments prepared according to the invention in Examples 4 and 5 showed excellent lightfastness while being easier to prepare and giving better retention in paper preparation than a simple zinc phosphate/hydroxide coating.

We claim:

1. A process for the production of a pigment comprising forming an aqueous dispersion of a titanium dioxide pigment containing a water soluble salt of zinc and a phosphate or phosphoric acid, adding to the dispersion an alkaline solution of an alkali metal aluminate to precipitate a coating containing zinc and phosphate ions and maintaining the pH of the dispersion during precipitation of the coatings at a value not exceeding 8.0.

2. A process according to claim 1 in which the amount of the said salt of zinc present is such as to provide 0.5% to 5% by weight zinc expressed as ZnO on the weight of TiO$_2$.

3. A process according to claim 1 in which the amount of phosphate or phosphoric acid present is such as to provide from 0.2% to 3.0% of phosphate expressed as P$_2$O$_5$ on weight of TiO$_2$.

4. A process according to claim 1 in which the pH of the dispersion during precipitation of the coatings does not exceed 7.0.

5. A process according to claim 1 in which an alkali is added to the dispersion prior to the addition of said alkali metal aluminate.

6. A process according to claim 1 in which an acidic source of aluminium is added to said aqueous dispersion prior to the addition of said solution of said alkali metal aluminate.

7. A process according to claim 6 in which the amount of the acidic source of aluminium is sufficient to provide less than half the total amount of aluminium species present in the product as coating.

8. A process according to claim 1 in which the titanium dioxide pigment carries on its surface a surface stabilizer.

9. A process according to claim 8 in which the surface stabiliser is antimony oxide.

10. A process according to claim 8 in which the surface stabiliser is selected from the class consisting of fluorides of barium, strontium, magnesium, tin, antimony, titanium, zirconium, sodium, potassium, ammonium, lithium, aluminium, zinc and of the rare earth metals.

11. A process according to claim 8 in which the surface stabiliser is calcium fluoride.

12. A process according to claim 1 in which said titanium dioxide pigment carries on its surface a stabilizer selected from the group consisting of metal chlorates, metal bromates, metal iodates, metaperiodates and paraperiodates.

* * * * *